United States Patent
Karlsson et al.

(10) Patent No.: US 10,972,176 B2
(45) Date of Patent: *Apr. 6, 2021

(54) COMMUNICATION SYSTEM FOR AIRCRAFTS

(71) Applicant: Icomera AB, Gothenburg (SE)

(72) Inventors: Mats Karlsson, Vålberg (SE); Peter Eklund, Gothenburg (SE); Joel Bjurström, Gothenburg (SE)

(73) Assignee: ICOMERA AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/613,166

(22) PCT Filed: May 16, 2018

(86) PCT No.: PCT/EP2018/062767
§ 371 (c)(1),
(2) Date: Nov. 13, 2019

(87) PCT Pub. No.: WO2018/210945
PCT Pub. Date: Nov. 22, 2018

(65) Prior Publication Data
US 2020/0186237 A1 Jun. 11, 2020

(30) Foreign Application Priority Data
May 17, 2017 (SE) .................................. 1750614-8

(51) Int. Cl.
*H04B 7/14* (2006.01)
*H04B 7/185* (2006.01)
(Continued)

(52) U.S. Cl.
CPC ........ *H04B 7/18506* (2013.01); *G01S 13/882* (2013.01); *H01Q 21/205* (2013.01);
(Continued)

(58) Field of Classification Search
CPC .... G01S 13/882; H01Q 21/205; H01Q 21/24; H04B 7/0413; H04L 12/40052; H04W 84/06
See application file for complete search history.

(56) References Cited

U.S. PATENT DOCUMENTS 10,084,529 B1 * 9/2018 Riechers ................ H04W 84/06
10,302,759 B1 * 5/2019 Arteaga ............... G08G 5/0021
(Continued)

FOREIGN PATENT DOCUMENTS

EP 2216909 A2 8/2010
EP 2518977 A1 10/2012
(Continued)

OTHER PUBLICATIONS

International Search Report (PCT/ISA/210) dated Oct. 17, 2018, by the European Patent Office as the International Searching Authority for International Application No. PCT/EP2018/062767.

Primary Examiner — Dai Phuong
(74) Attorney, Agent, or Firm — Buchanan Ingersoll & Rooney P.C.

(57) ABSTRACT

A system and method for providing wireless data communication between a wireless communication system in an aircraft and a stationary communication server outside the aircraft are disclosed. The wireless communication system includes a router network connected to a plurality of antennas, wherein the router network is configured to transmit and receive wireless data communication to and from a stationary communication server outside said aircraft through at least one ground base station via said antennas. The router network includes a plurality of connectivity nodes being physically separated and distributed within the aircraft, the connectivity nodes being connected to each other via a bus, and each connectivity node including a control unit, at least one modem, and preferably a plurality of modems, and a
(Continued)

connection to at least one of the antennas. Further, each antenna is connected only to one of the connectivity nodes.

13 Claims, 9 Drawing Sheets

(51) Int. Cl.
*G01S 13/88* (2006.01)
*H01Q 21/20* (2006.01)
*H01Q 21/24* (2006.01)
*H04B 7/0413* (2017.01)
*H04L 12/40* (2006.01)
*H04W 84/06* (2009.01)

(52) U.S. Cl.
CPC ........... *H01Q 21/24* (2013.01); *H04B 7/0413* (2013.01); *H04L 12/40052* (2013.01); *H04W 84/06* (2013.01); *H04L 2012/4028* (2013.01)

(56) References Cited

U.S. PATENT DOCUMENTS

| | | |
|---|---|---|
| 2005/0053026 A1 | 3/2005 | Mullan et al. |
| 2012/0007982 A1 | 1/2012 | Giuffrida et al. |
| 2014/0327577 A1 | 11/2014 | Ozaki et al. |
| 2016/0139603 A1* | 5/2016 | Bianchi ............... B64C 39/024 701/4 |
| 2017/0084987 A1 | 3/2017 | Rieth et al. |
| 2017/0149122 A1* | 5/2017 | Allen ................. H04B 7/18506 |
| 2017/0150373 A1* | 5/2017 | Brennan ............... H04W 16/28 |
| 2019/0260462 A1* | 8/2019 | Axmon ............. H04B 7/18523 |
| 2020/0036088 A1* | 1/2020 | Bongard ............. H01Q 21/064 |

FOREIGN PATENT DOCUMENTS

| | | | |
|---|---|---|---|
| GB | 2443463 A | | 5/2008 |
| GB | 2477960 A | | 8/2011 |
| WO | 9923769 A1 | | 5/1999 |
| WO | 0217675 A2 | | 2/2002 |
| WO | WO 02/17675 | * | 2/2002 |
| WO | 2013010361 A1 | | 1/2013 |
| WO | WO 2013/010361 | * | 1/2013 |
| WO | 2015169917 A1 | | 11/2015 |
| WO | 2016061535 A1 | | 4/2016 |

* cited by examiner

COMMUNICATION SYSTEM FOR AIRCRAFTS

TECHNICAL FIELD OF THE INVENTION

The present invention relates to the field of wireless communication technology, and more specifically to a wireless communication system and method particularly suitable for aircrafts, such as helicopters and airplanes.

BACKGROUND

It is not an understatement that the last few decades have introduced vast improvements and advancements in the field of communication technology. In fact, the advent of the internet, cellular phones and more recently smart phones and tablets has greatly changed the way we communicate and quite possibly accelerated the technological field surrounding these devices. As an inevitable consequence, there is an ever increasing demand for bandwidth in order to satisfy the market need for online connectivity which results in an increased focus on constantly developing and improving the underlying technology and systems in order to accommodate this demand.

Further, there is a rapidly increasing demand from consumers to be able to communicate through mobile phones and other handheld terminals at all times, even while traveling on trains, busses, ships and even aircrafts. This is partially embodied in the increasing availability of in-flight entertainment systems and wireless communication (Wi-Fi, GSM, 3G, LTE, 5G) capability onboard aircrafts.

Wireless communication capability onboard aircrafts is not a new concept, even the earliest commercial aircrafts had rather primitive voice communication capability with ground personnel over shortwave radio, which improved flight safety and enabled accelerated commercialization of air transport. Since then, airborne communication systems have been further improved with advent of radar, computers and data links, which serve to improve in-flight safety as well as the overall traveling experience for passengers.

However, regardless of recent developments of communication platforms for aircrafts, it has proven to be difficult for presently known systems to provide robust, broadband communication for aircrafts such as helicopters, airplanes and the like.

Thus, in view of the above, there is a need for an improved wireless aircraft communication system which provides better capacity, improved reliability while still being cost effective.

SUMMARY OF THE INVENTION

It is therefore an object of the present invention to provide a wireless communication system for an aircraft, such as a helicopter or an airplane, which alleviates all or at least some of the drawbacks of presently known systems. Another object of the invention is to provide a means for robust and stable wireless connectivity in aircrafts.

This object is achieved by means of a wireless communication system for wireless data communication between a wireless communication system in an aircraft and a stationary communication server outside the aircraft, as defined in the appended claims.

According to a first aspect of the present invention, there is provided a wireless communication system for an aircraft, said wireless communication system comprising:

a router network connected to a plurality of antennas, wherein the router network is configured to transmit and receive wireless data communication to and from a stationary communication server outside said aircraft through at least one ground base station via said antennas, wherein the router network comprises a plurality of connectivity nodes being physically separated and distributed within the aircraft, the connectivity nodes being connected to each other via a bus, and each connectivity node comprising a control unit, at least one modem, and preferably a plurality of modems, and a connection to at least one of the antennas, and wherein each antenna is connected only to one of the connectivity nodes.

The invention is particularly suited for wireless communication systems for aircrafts where many antennas are arranged at various positions on the aircraft. It is often advantageous to provide many antennas on aircrafts, both to be able to use many links simultaneously, and to be able to provide different antenna types, such as both omnidirectional antennas and directional antennas. However, the use of many antennas leads to much wiring, which is both costly to mount during installation, and is also very heavy. There is a strong requirement on aircraft manufacturers to reduce the weight of the aircrafts, and thereby providing improved fuel economy etc.

The present invention is based on the realization that by providing a router network with a plurality of connectivity nodes being physically separated and distributed within the aircraft, many or all of the antennas can be connected to the connectivity node being closest to the antennas, and the connectivity nodes can be arranged close to the locations where antennas are arranged. Hereby, the wiring to the antennas can be greatly reduced. Instead, a great deal of all the wiring normally necessary to connect all the antennas to the router is here replaced by a bus connecting the connectivity nodes to each other. The bus can e.g. be an Ethernet bus. It is estimated that the weight saving obtained by this can be several hundred kilograms for large systems.

Further, there is a great problem with power loss when using long antenna cables. By means of the present invention, this problem is efficiently alleviated, since the losses in a data bus, such as in an Ethernet bus, is insignificant, and the total length of electrical cables can be greatly reduced.

Thus, the system of the present invention is very cost-efficient, inter alia due to the lowered weight, simplified installation, greater power efficiency, etc.

The router network may be a distributed computing network, without any master node. In such an embodiment, each of the connectivity nodes may serve as a router, and may co-operate in performing the tasks of a conventional router.

Alternatively, the router network may be a centralized computing network, comprising a master node. The master node may be one of the connectivity nodes, or may be an additional router node in the network. In such a centralized system, the router node is preferably arranged to receive all data communication within the network, and to determine how to route the data communication to the different connectivity nodes.

The bus may be an Ethernet bus. However, other types of buses may be used instead, such as any bus for serial communication.

The router network may further comprise at least one client node, arranged to receive and transmit data communication to and from at least one client onboard the aircraft. The client node may e.g. be realized as an access point for WLAN, preferably in accordance with the IEEE 802.11 standard. The connectivity nodes are preferably arranged at various positions in the aircraft, and preferably relatively close to the antenna or group of antennas to which they are connected. It is further preferred that at least one connectivity node is located in an aft section of the aircraft, and that at least one connectivity node is located in a fore section of the aircraft. Put differently, it is preferred that the distance between the two connectivity nodes being farthest from each other is at least 50% of the length of the fuselage of the aircraft, and preferably at least 60%, and more preferably at least 70%, and most preferably at least 80%.

The plurality of antennas may comprise at least one omnidirectional antenna and at least one directional antenna. Such a combination of antennas has been found to be very efficient in providing data communication to aircrafts, as is discussed in more detail in the following. In particular, the system may be configured to restrict the wireless data communication through said at least one omnidirectional antenna when a current altitude of said aircraft is above a certain altitude, and preferably restrict said wireless data communication to solely occur through said at least one directional antenna when a current altitude of said aircraft is above a certain altitude.

The wireless communication system may further comprise an altitude determining unit configured to determine the current altitude of the aircraft. The system may be configured to restrict the wireless data communication through said at least one omnidirectional antenna when a current altitude of the aircraft is above a certain altitude, and preferably restrict the wireless data communication solely to occur through said at least one directional antenna when a current altitude of the aircraft is above a certain altitude. In particular, the router network may comprise a control unit configured to restrict the wireless data communication to solely occur through the at least one directional antenna when a current altitude of the aircraft is above a predefined altitude threshold value, such as a predefined threshold or a dynamically adjustable/settable threshold.

Thus, the system is capable of selecting the type of antenna(s) that is to be used for the wireless data communication (between the router network and the ground base station(s)) based on a current altitude of the aircraft in order to optimize performance at high and low altitudes.

The restriction of communication to occur through a specific type of antenna may preferably be an active control, e.g. realized by disabling the other type(s) of antennas or by actively controlling the data routes or links. However, the restriction of communication via the omnidirectional antennas may also be made passively, by allowing the ground base station restricting or disabling at a certain altitude, due to poor link or signal quality, too much interference, and the like. At a high altitude, the communication is preferably restricted to only occur through the directional antenna(s). However, at lower heights below that high altitude, there may be a gradual transition from a unrestricted state to the fully restricted state, so that the communication through the omnidirectional antenna(s) is gradually or stepwise more and more restricted between a certain lower altitude and the certain higher altitude.

In case an altitude threshold value is used for active control of the antennas, the altitude threshold value may be one or several predefined, static value(s). However, instead of using static, predefined altitude threshold value(s), the altitude threshold value(s) may be set and adjusted dynamically, in dependence on the context and present conditions. For example, the link and/or signal quality may be monitored when the aircraft is moving upwards, and when the link or signal quality becomes too poor, an altitude threshold value may be set at the altitude when this was detected, thereby disabling or restricting the use of one or several of the antennas when the aircraft remains at altitudes above this threshold value.

This is based on the realization that some of the drawbacks associated with altitude/elevation dependencies in airborne broadband connectivity based on terrestrial cellular technologies (e.g. LTE or 5G) can be overcome by employing a new antenna strategy. In more detail, it has been realized that the radio link to and from the aircraft may be subject to severe interference caused by the immense amount of ground base stations (e.g. several hundreds) that is in perfect line of sight with the aircraft. This being caused by the high altitude of the aircraft and the fact that the horizon will typically be at a distance around 100 km away (at altitudes above approx. 500 m). Thus, the present inventors realized that by configuring the system to only employ directional antennas (beam antennas) at altitudes above a certain altitude/elevation it is possible to limit the interference causing the performance degradation, i.e. by limiting the transmission into a narrower sector of the ground surface. Moreover, the directional antenna(s) is/are preferably high gain directional antennas, which will cover a relatively small footprint on the ground surface and will due to higher gain pick up weaker signals (signal strength decreasing as the distance squared in free space).

It has thus been found that omnidirectional antennas often has better performance and capacity than directional antennas at lower heights, but that the capacity and performance for the omnidirectional antennas deteriorates much more rapidly than for directional antennas when the height increases.

Accordingly, it is possible to use omnidirectional antennas at altitudes up to a certain level and thereafter switch over to communication solely over the directional antennas above that level, leading to improved radio performance at a wide range of altitudes.

The "router network" preferably performs the function of a networking router, and forwards data packets between computer networks, preferably on at least two data links in each direction. Stated differently, the router network is capable of providing data communication between an internal local area network (arranged within the aircraft) and an external wide area network (WAN) outside the aircraft. The router network may function as a mobile access router (MAR), and preferably a mobile access and applications router (MAAR). The router network further comprises means (e.g. a control unit or controller) for controlling which antennas are to be used at which altitudes. More specifically, the router network preferably comprises means for selecting/defining a set of omnidirectional antennas which are to be disabled once the aircraft exceeds a certain altitude threshold value in order to force or restrict the wireless data communication between the aircraft and the ground base station(s) to one or more of the directional antennas.

Various antenna setups are considered to be feasible, e.g. passive antennas (omni monopole antennas, omni dipole antennas, high gain directional patch antennas, etc.) or passive beam forming arrays (various polarizations such as linear and circular, linear, planar, etc.). Moreover, the wireless communication system preferably comprises a plurality of omnidirectional antennas (e.g. one for each carrier) and a plurality of directional antennas. In reference to the directional antennas, they can be arranged in separate groups, each group targeting specific sectors of the ground surface. Each group of directional antennas may comprise a plurality of directional antennas (e.g. one for each modem or carrier).

Moreover, each antenna may optionally be an orthogonal pair antenna (e.g. antenna pair with orthogonal polarization), also known as cross-polarized antenna. In other words, the orthogonal antenna diversity can be realized by means of polarization diversity, i.e. by combining pairs of antennas with orthogonal polarizations (e.g. horizontal/vertical linear polarization, ±slant 45°, Left-hand/Right-hand circular polarization etc.). Such antennas are very suitable for MIMO communication.

The antennas can be close and multiple antennas can be packed in groups in smaller areas, making it very suitable for avionic applications. In particular, the directional antennas may be arranged as patch antennas, antenna arrays etc.

The plurality of antennas may be mounted to and/or integrated in an external surface of said aircraft.

The plurality of antennas may comprise at least two omnidirectional antennas distributed along a length of the aircraft.

Preferably at least some, and preferably all, of the antennas are orthogonal pair antennas.

Further, the router network preferably comprises a plurality of modems, distributed among the connectivity nodes, for communication with the external stationary communication server, each modem being associated with and connected to at least one antenna. So, in a communication system adapted to be compatible with three different LTE operators and having the directional antennas arranged in four groups in order to target four preferably non-overlapping sectors of the ground surface, there may be 15 modems provided (3 for the omnidirectional antennas and 12 for the directional antennas). Preferably the router network comprises at least 8 modems, more preferably at least 10 modems, and most preferably at least 15 modems.

In terms of general operation of the communication system, the router network and the stationary (remote) communication server are preferably connected through a plurality of exterior mobile/cellular networks (provided by the ground base stations), which are simultaneously useable. Also, the router network is preferably arranged to communicate with the stationary communication server on at least two different data links (communication routes) having different characteristics (e.g. on different frequency bands), and then to automatically separate the data traffic between the data links based on an evaluation of link quality. The evaluation of link quality may for example be executed as disclosed in WO 2015/169917, by the same applicant, said document incorporated herein by reference. The data streams are then forwarded on one or several links to and from a dedicated external server, which may be referred to as an aggregation server or gateway. The different links thereby form a single virtual link between the router network and the gateway.

The control unit may be configured to:
evaluate a data link quality between said at least one ground base station and said at least one omnidirectional antenna;
disable said at least one omnidirectional antenna when said data link quality is below a predefined quality threshold value. Stated differently, all antennas of the communication system may be used or employed continuously until the aircraft rises above a certain altitude (e.g. somewhere in the range of 500 m-1500 m), above which, communication is switched to solely occur through the directional antenna(s). This altitude may be defined by a dynamic threshold, and may consequently be detected based on increasing interference between signals from the vast amount of competing ground base stations which negatively affects radio performance.

However, in accordance with another embodiment of the present invention, the wireless communication system further comprises:
an altitude determining unit configured to determine the current altitude of the aircraft; and
wherein said control unit is operably connected to said altitude determining unit, said control unit being further configured to disable wireless data communication via said at least one omnidirectional antenna when the current altitude is determined to be above a certain altitude, and preferably a predefined altitude threshold value. In other words, altitude determining unit (which may be a unit within the router network or an external unit such as the aircraft's altimeter) notifies the control unit that the aircraft has reached or surpassed the predefined altitude threshold value, upon which the control unit disables wireless data communication via the omnidirectional antenna(s).

The altitude determining unit is preferably configured to continuously monitor and determine the altitude of the aircraft. Further, as mentioned, the altitude determining unit may be integrated within the control unit or a stand-alone component external to the router network and associated with an altimeter/altitude meter which is configured to determine an altitude of the aircraft based on e.g. a measurement of atmospheric pressure. The control unit of the router network may accordingly be coupled to the external altimeter (e.g. the altimeter of the aircraft).

However, the altitude determining unit may in some embodiments of the present invention be provided within the router network, and may furthermore for example be a Global Navigation Satellite System GNSS unit, such as e.g. a GPS-unit, GLONASS-unit, Galileo-unit, etc. depending on the preferred regional system. By providing the altitude determining unit within the router network, the wireless communication system becomes a stand-alone system which is easy to install and therefore can be retrofitted into existing aircrafts without requiring any coupling to the aircraft's integrated altimeter.

The plurality of antennas may be mounted to an external surface of the aircraft. External surface may be understood as the "chassis" of the aircraft, including the aircraft fuselage, wings, stabilizers, etc. Thus, the antennas may be mounted on any part of aircraft, however, naturally not in such a manner so that they impair the function or operational safety. However, all or some of the plurality of antennas may be integrated in an external surface of the aircraft.

The certain altitude may comprise a first altitude threshold value; and
the control unit may further be configured to:
receive and store a second altitude threshold value which is lower than the first altitude threshold value,
disable wireless data communication via the at least one directional antenna when the current altitude is determined to be below the second altitude threshold value.

Stated differently, the system may be arranged with two different altitude thresholds, for example 1000 m and 500 m, accordingly, the control unit is configured to actively enable or disable the antenna(s) based on the determined current altitude of the aircraft. More specifically, the control unit may then be configured to only allow wireless data communication via the omnidirectional antenna(s) when the altitude of the aircraft is below the lower threshold, such as 500 m, by disabling the directional antennas. However, once the aircraft reaches above the first threshold, i.e. the higher threshold altitude of e.g. 1000 m the control unit can be configured to disable the omnidirectional antennas, thereby restricting the wireless communication to the directional antennas. In the altitude range between the two altitude threshold values the control unit may be configured to enable and thereby allow communication via both the directional antenna(s) and the omnidirectional antenna(s).

Moreover, the plurality of antennas comprises at least two groups of directional antennas, each group comprising at least one directional antenna and each group being arranged to radiate and/or receive radio waves to and/or from essentially non-overlapping sectors of a ground surface below the aircraft. The sectors are preferably entirely non-overlapping. However, a small amount of overlap may still be acceptable, such as an area overlap of less than 25%, less than 20%, less than 15%, less than 10% or less than 5%.

By arranging the directional antenna(s) of the communication system such that they are oriented so that their "beams" to a large extent do not overlap, the negative effects of signal interference can be reduced and the overall radio performance of the communication system thereby improved. A sector is effectively just an area of the ground surface below the aircraft.

Further, the aircraft may comprise a first axis and a second axis transverse to the first axis, the first axis and second axis extending in a common horizontal plane and together define four non-overlapping sectors of the ground surface when projected onto the ground surface below the aircraft;

wherein the plurality of antennas comprises four groups of directional antennas, each group comprising at least one directional antenna and each group being oriented to radiate and/or receive radio waves towards/from a separate non-overlapping sector. Stated differently, each group of directional antennas is arranged to target one out of four predefined sectors of the ground surface. The groups may be distributed symmetrically or asymmetrically depending on intended application and predefined specifications.

For example, three groups may be arranged to target the same side with respect to the aircraft's roll axis, while one group may be arranged to target the right side. In a more symmetric configuration, the four groups may be arranged to transmit/receive in a north-west direction, a north-east direction, a south-east direction and a south-west direction, respectively, where the aircraft's tail is referenced as "south" and the aircraft's nose is referenced as "north". Naturally, the skilled reader understands that all of the radio wave beams radiated/emitted by the directional antennas have a vertical vector component (i.e. the beams are radiated/received towards/from a ground base station).

Thus, in accordance with yet another embodiment of the present invention, the aircraft comprises a roll axis and a pitch axis which define four separate quadrant sector when projected onto a ground surface below the aircraft; and wherein the plurality of antennas comprises four groups of directional antennas, each group comprising at least one directional antenna and each group being oriented to radiate and/or receive radio waves towards/from a separate quadrant sector.

Further, with regards to the placement of the antennas on the aircraft, and in accordance with yet another embodiment of the present invention, the aircraft further comprises a vertical axis, and wherein said roll axis and vertical axis together define a first vertical plane, and wherein said pitch axis and vertical axis together define a second vertical plane intersecting said first vertical plane;

wherein said first vertical plane and said second vertical plane together define four separate portions of a fuselage of the aircraft; and wherein said four groups of directional antennas are arranged at separate portions of said fuselage. Hereby, the aircraft's fuselage may efficiently be utilized to provide sufficient separation and shielding between each individual group of directional antennas.

The beam of each directional antenna may be predefined and fixed with respect to the aircraft's fuselage. However, the beams of the directional antennas may also be adjustable. The beam forming can be obtained mechanically, e.g. by mounting the antennas on movable surfaces such that their beams with respect to the aircraft may be controlled and altered. The beam forming may also be obtained electronically, while the antenna is physically fixed, by electronically controllable antennas. Such electronic beam forming can be made in each antenna component, or by controlling a group of antennas in correlation. The beam forming control can be made by the control unit, by the modems and the like.

Further, the plurality of antennas may comprise at least two omnidirectional antennas distributed along a length of the aircraft.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the detailed embodiments described in the following are related to helicopters. However, it is to be acknowledged by the skilled reader that the method and system are correspondingly useable on other aircrafts, such as airplanes and the like.

Figure 1:
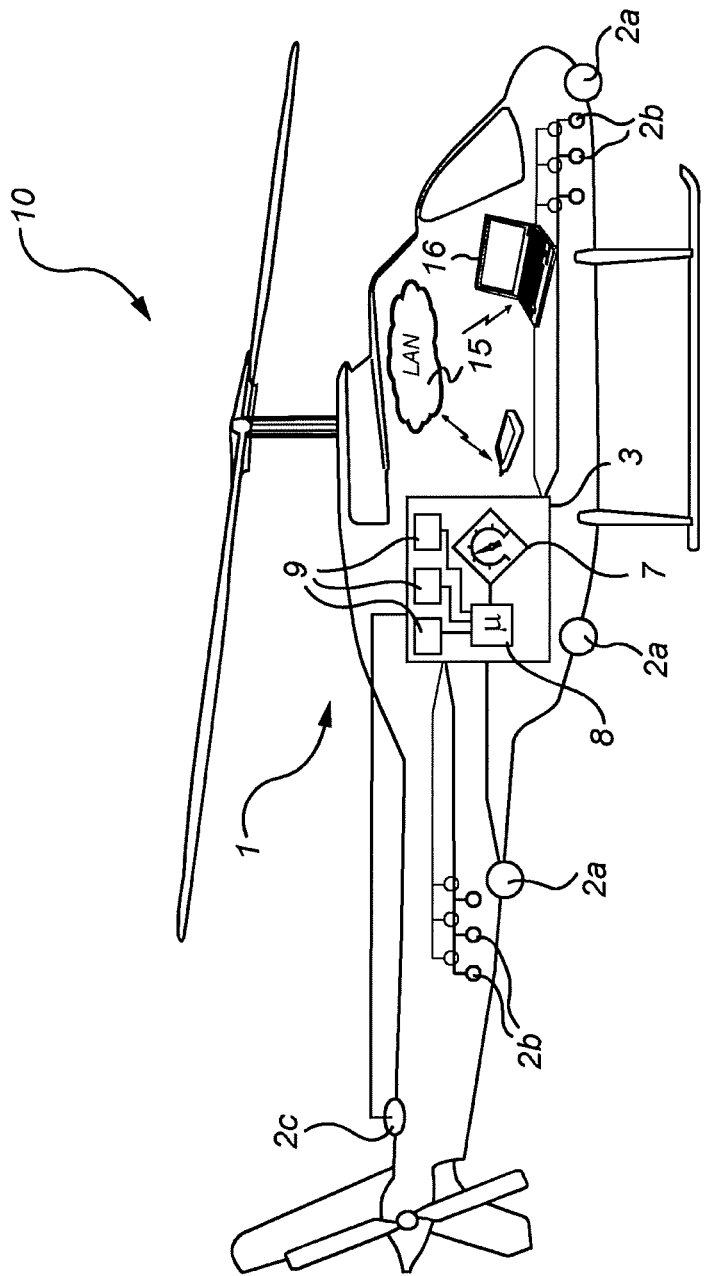
FIG. 1 is a schematic side-view illustration of an aircraft having a wireless communication system in accordance with an embodiment of the present invention.

FIG. 1 is a schematic illustration of an aircraft 10, here in the form of a helicopter, having a wireless communication system 1 in accordance with an embodiment of the invention. The wireless communication system 1 has a data communication router network 3 and a plurality of antennas 2a, 2b, 2c connected to the router network 3. The router network 3 is here, for simplicity, illustrated as a single unit. However, as will be discussed in more detail in the following, the router network comprises a plurality of units, arranged as nodes, connected by a bus. The router network is configured to receive and transmit data between an internal local area network (LAN), and one or several external wide area networks (WANs). The external wide area networks are preferably cellular networks provided by one or more ground base stations (see e.g. ref. 6a, 6b, 6c in FIGS. 2-4).

The system 1 comprises a plurality of antennas 2a-2c such as at least one omnidirectional antenna 2a (three in the illustrated embodiment), and/or at least one directional antenna 2b (twelve in the illustrated embodiment) and optionally one or more satellite antennas 2c (one in the illustrated embodiment). The omnidirectional antennas 2a may for example be passive antennas such as e.g. omni monopole antennas or omni dipole antennas. The directional antennas 2b may for example be passive beam forming arrays having various polarizations. Moreover, each antenna 2a-2c may be realized as an antenna orthogonal pair by e.g. using a dual polarized antenna setup with a 90-degree angle between two linear polarizations or using circular left- and right handed polarizations. However, in alternative embodiments spatial diversity may be utilized to achieve orthogonal antenna diversity.

The antennas 2a-2c may be mounted to an external surface of the aircraft 10, such as e.g. to the aircraft's 10 fuselage 11. However, the antennas 2a-2c may also be integrated in the external surface of the aircraft 10. A combination of these two is also feasible.

The router network 3 further has a plurality of modems 9, where each antenna 2a-2c, or each antenna orthogonal pair, preferably is assigned and connected to a separate modem 9. In case of the latter each modem 9 is preferably provided with 2 antenna ports for connection to each orthogonal antenna pair. However, each modem may also be provided four or more ports for compliance with MIMO (Multiple Input Multiple Output) systems. Even though only 3 modems are shown in the illustration it is apparent for the skilled reader that the router network 3 may include a larger number of modems 9, and that this was avoided in order to avoid cluttering in the drawings. More specifically, in the embodiment illustrated in FIG. 1 with 3 omnidirectional antennas 2a, 12 directional antennas 2b and 1 satellite antenna 2c the router network preferably comprises 15 modems.

Figure 3A:
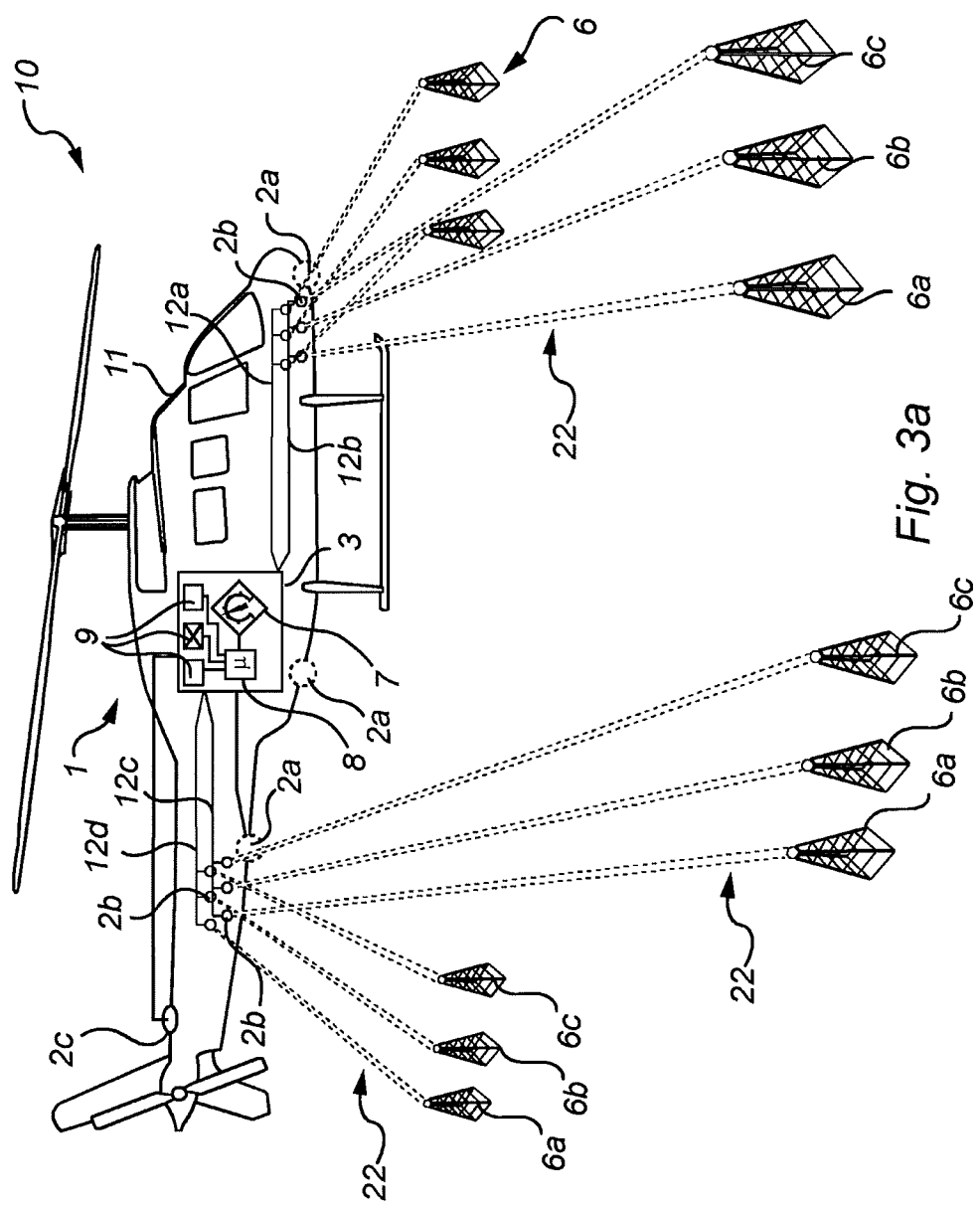
FIG. 3a is a schematic side-view illustration of an aircraft having a wireless communication system, the aircraft being at an altitude above some predefined altitude threshold, in accordance with an embodiment of the present invention.
Figure 4:
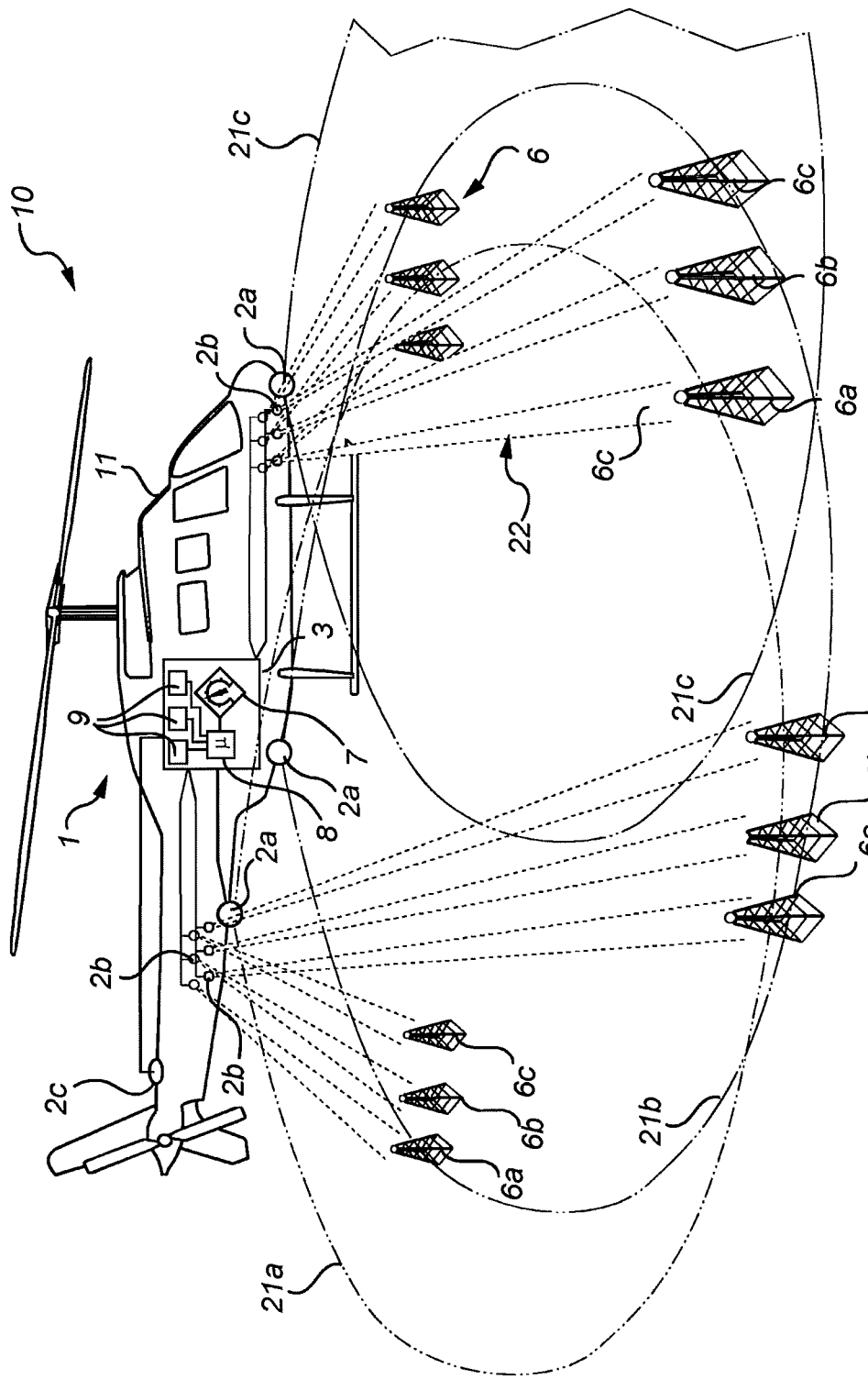
FIG. 4 is a schematic side-view illustration of an aircraft having a wireless communication system, the aircraft being at an altitude between two predefined altitude thresholds, in accordance with an embodiment of the present invention.

Further, the router network 3 has at least one control unit 8 (e.g. a microprocessor) preferably configured to restrict the wireless data communication to solely occur through the directional antennas 2b, when a current altitude of the aircraft 10 is above a predefined altitude threshold value (see e.g. FIG. 3a). The control unit 8 is preferably realized as a software controlled processor. However, the control unit 8 may alternatively be realized wholly or partly in hardware. Further, the control unit 8 may for example be configured to evaluate a data link quality between the ground base station(s) and each omnidirectional antenna 2a. If the data link quality is too poor and below a predefined quality threshold, e.g. due to high signal interference, the control unit is configured to disable the omnidirectional antennas 2a (e.g. by disabling the modems 9 associated with the omnidirectional antennas 2a) and thereby restrict the communication to occur solely through the directional antennas 2b.

Alternatively, the router network 3 may be provided with an altitude determining unit 7 configured to determine a current altitude of the aircraft 10. The altitude determining unit 7 is preferably configured to continuously monitor and determine the altitude of the aircraft, and may for example be a Global Navigation Satellite System, GNSS, provided within the router network 3, such as e.g. GPS, GLONASS, Galileo system, BeiDou system, etc. By providing a GNSS internally within the router network 3, installation of the wireless communication system 1 is facilitated as there is no need for establishing an operational connection between the aircraft's 10 internal altimeter (not shown) and the router network. Moreover, the inventive system 1 may thereby easily be retrofitted into existing aircrafts 10. Thus, the control unit 8 may accordingly be connected to the altitude determining unit 7, and configured to disable wireless data communication with the omnidirectional antennas 2a when the current altitude of the aircraft 10 is determined to be above a predefined altitude threshold value.

The altitude threshold value may be any value in the range of 500 m to 1500 m, such as for example, 600 m, 700 m, 800 m, 900 m, 1000 m, 1100 m, 1200 m, 1300 m or 1400 m. In particular, it is preferred that the height at which the communication through the omnidirectional antenna(s) is restricted or disabled is in the range of 200-5000 m, and preferably 500-3000 m, and most preferably 500-1500 m.

However, the control unit 8 may be configured to store a plurality of altitude threshold values. In more detail, the control unit 8 may be configured to receive two altitude threshold values, a first altitude threshold value (e.g. 1000 m) above which, the wireless data communication solely occurs through the directional antennas 2a (see e.g. FIGS. 3a-3b), and a second altitude threshold value (e.g. 500 m) below which, the wireless data communication solely occurs through the omnidirectional antennas 2a (see e.g. FIG. 2). Moreover, the control unit 8 may be configured to allow wireless data communication to occur through any suitable antenna 2a-2b, if the current altitude of the aircraft 10 is determined to be between the aforementioned two threshold values, as e.g. illustrated in FIG. 4.

Figure 2:
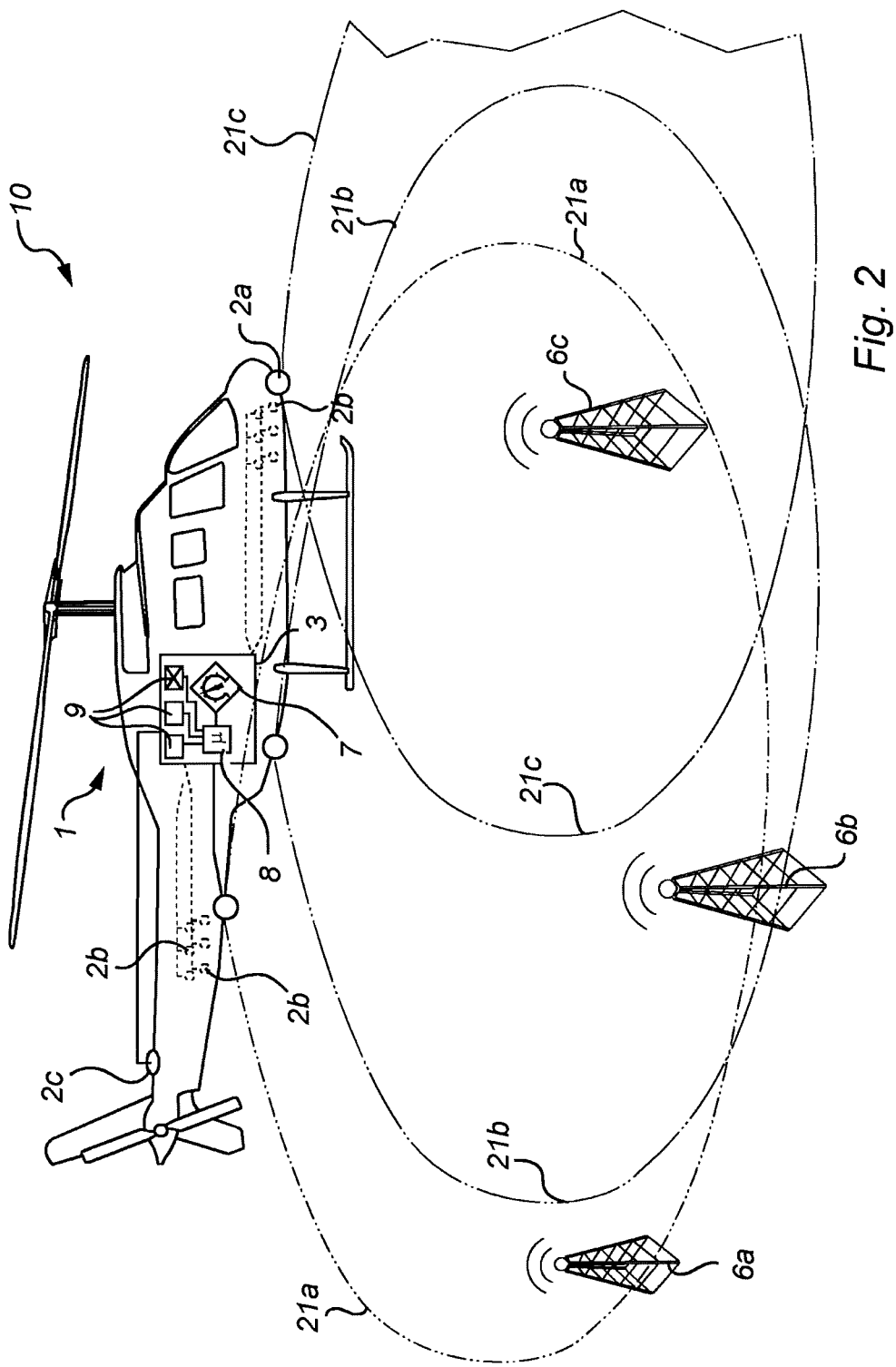
FIG. 2 is a schematic side-view illustration of an aircraft having a wireless communication system, the aircraft being at an altitude below some predefined altitude threshold, in accordance with an embodiment of the present invention.

FIG. 2 schematically illustrates an aircraft 10 from a side-view perspective, having a wireless communication system 1 according to an embodiment of the invention. In more detail, the control unit 8 has determined that the current altitude is below a predefined threshold value (e.g. by means of the altitude determining unit 7 or radio link evaluation) and therefore disabled the directional antennas 2b, in order to restrict the wireless data communication between the router network and the ground base stations 6a-6c to solely occur through the omnidirectional antennas 2a. The "radio wave beams" for the omnidirectional antennas 2a are schematically indicated by the broken lines 21a-21c.

In each of the embodiments illustrated in FIGS. 2, 3a, 3b and 4, the system 1 is arranged to be compatible with three different cellular network operators which are represented by a corresponding ground base station 6a, 6b and 6c respectively. Therefore, each system 1 in these embodiments comprises three omnidirectional antennas 2a, and each group of directional antennas 2b has three directional antennas 2b. Further, the plurality of omnidirectional antennas 2a are preferably distributed along a length of the aircraft, and the directional antennas 2b are preferably arranged in individual groups in order to target non-overlapping sectors of the ground surface below the aircraft 10.

FIG. 3a schematically illustrates the aircraft 10 from FIG. 2b, however, at a higher altitude. More specifically, it serves to illustrate how the wireless communication system 1 operates when the aircraft 10 is determined to be above a predefined altitude threshold (illustratively indicated by the meter in the altitude determining unit 7). Here, the omnidirectional antennas 2a have been disabled, or more specifically, wireless data communication via the omnidirectional antennas 2a has been disabled. Thus, the wireless data communication is restricted to solely occur through the directional antennas 2b, as schematically indicated by the "radio wave beams" 22.

Moreover, the directional antennas 2b are arranged in separate groups 12a-12d in order to target specific sectors of the ground surface below the aircraft 10. In more detail, the wireless communication system 1 comprises four groups 12a-12d of directional antennas 2b, each group being arranged or oriented to radiate and/or receive radio waves to and/or from non-overlapping sectors of the ground surface below the aircraft 10.

Figure 3B:
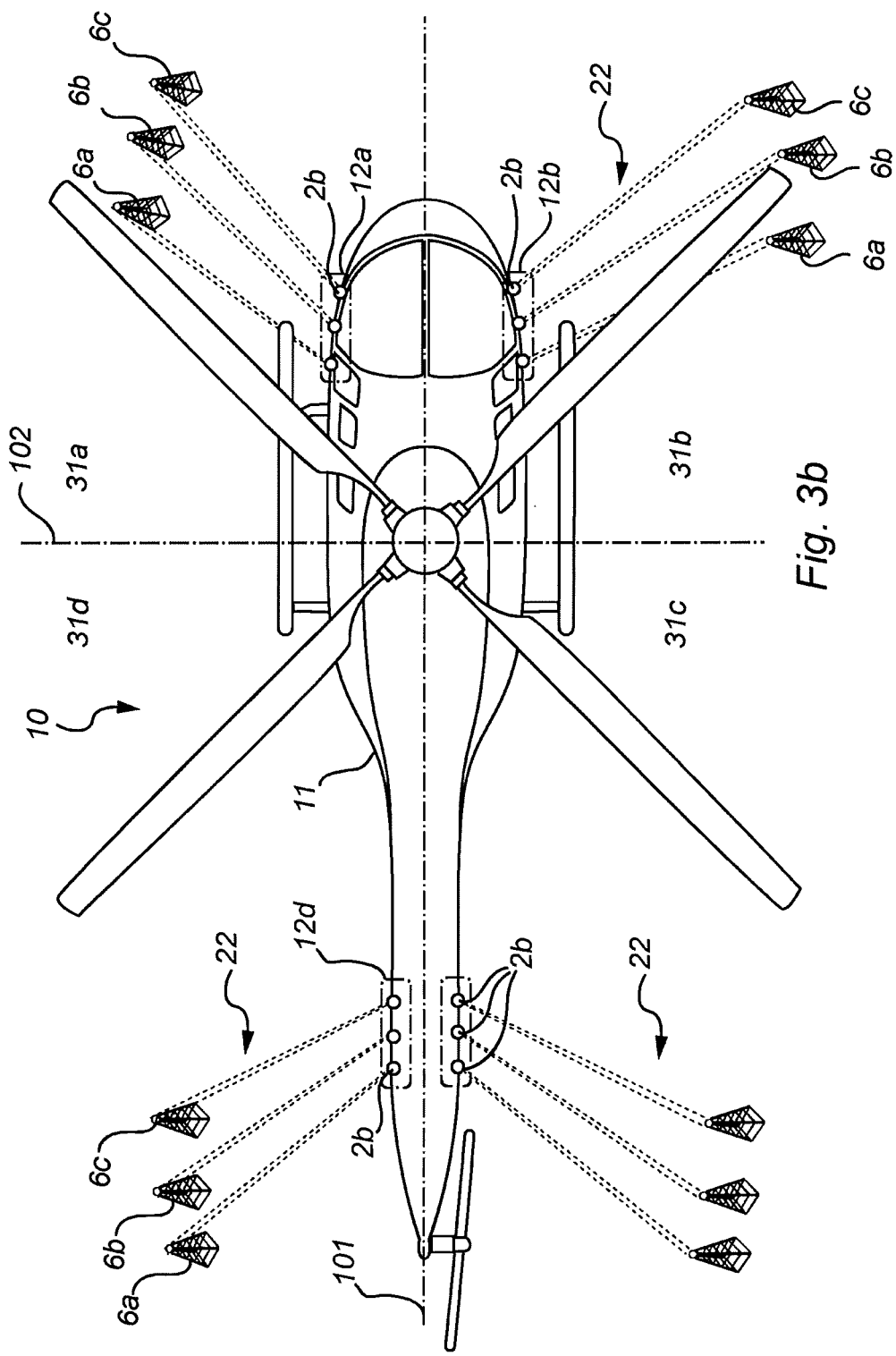
FIG. 3b is a schematic top-view illustration of the aircraft in FIG. 3.

As is more clearly illustrated in FIG. 3b, the aircraft comprises a first axis 101 (roll axis) and a second axis 102 which is transverse to the first axis 101. The two axes 101, 102 both extend in a common horizontal plane and together define four non-overlapping sectors 31a-31d of the ground surface below the aircraft 10. Accordingly, each group 12a-12d of directional antennas 2b is arranged or oriented to radiate and/or receive radio wave towards/from a respective non-overlapping sector 31a-31d. In the illustrated embodiment, the second axis 102 is perpendicular to the first axis 101 and may be construed as a pitch axis, however, the skilled reader realizes that the second axis 102 need to be perfectly perpendicular to the first axis 101 in order to achieve the desired effect.

Moreover, the aircraft 10 further has a vertical axis (not shown) which together with the first axis 101 defines a first vertical plane, and together with the second axis 102 defines a second vertical plane which intersects the first vertical plane. The two planes effectively define four separate portions of the aircraft's fuselage 11. Each group 12a-12d of directional antennas 2b is arranged at a respective portion of the aircraft's fuselage 11 in order to provide sufficient separation between different antenna groups and utilize the fuselage 11 to reduce the chance of beams 22 overlapping between different groups 12a-12d.

Figure 5:
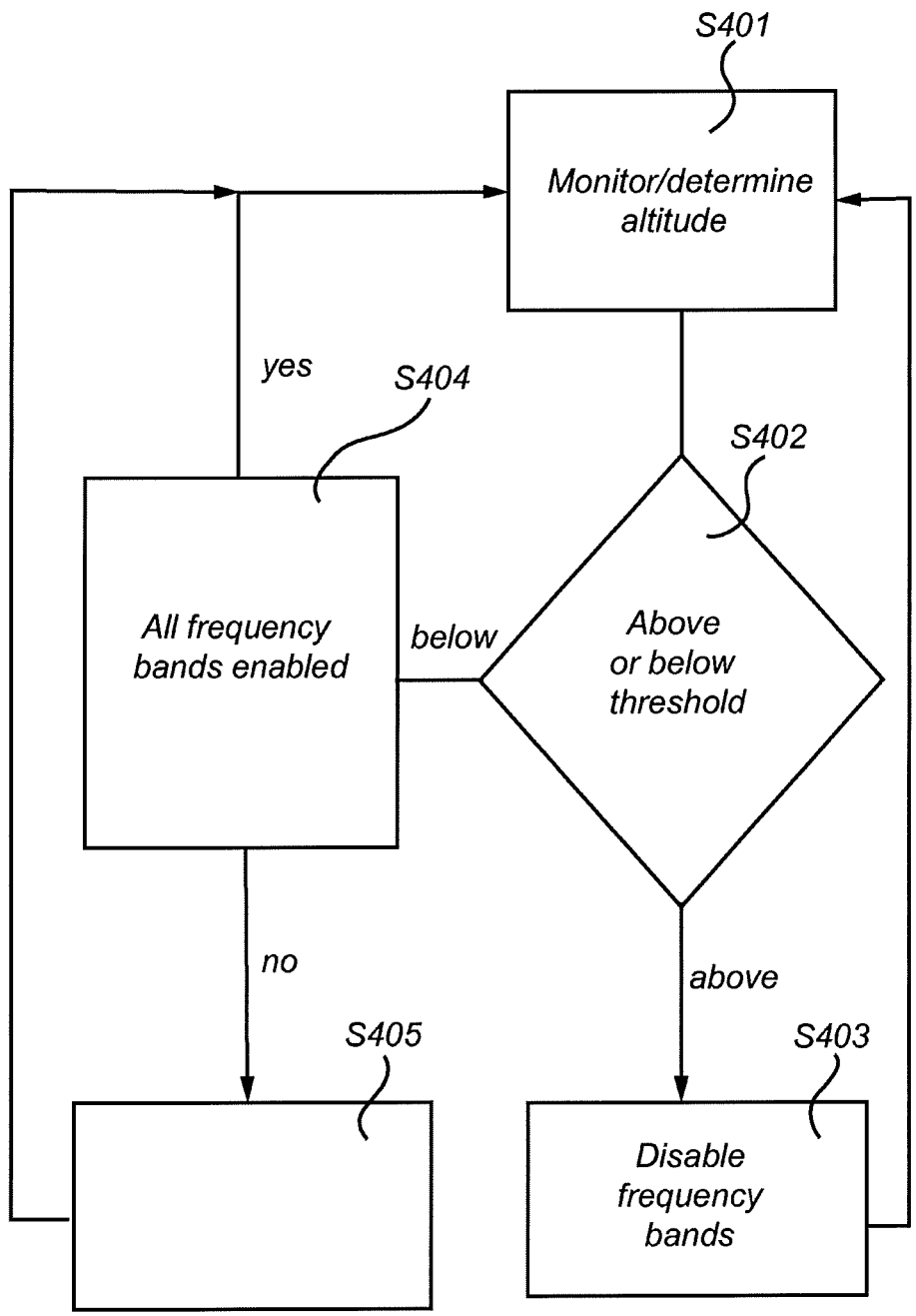
FIG. 5 is a schematic flow chart representation of a method for wireless data communication in accordance with an embodiment of the present invention.

FIG. 5 is a schematic flow chart representation of a method for wireless data communication between a wireless communication system in an aircraft and a stationary communication server outside the aircraft, in accordance with an embodiment of the invention.

Firstly, a router, or more specifically a router network, is provided within the aircraft. The router network may be any router network according to any of the above discussed embodiments of the inventive wireless communication system. The router network is connected to a plurality of antennas and configured to transmit and receive wireless data communication to and from the stationary communication server outside the aircraft through at least one ground base station via at least one of the antennas. Moreover, the plurality of antennas comprises one or more omnidirectional antennas and one or more directional antennas.

Next, an altitude of the aircraft is monitored/determined, S401. When the current altitude is determined by an altitude determining unit or any control unit of the router network, a check is performed, S402, to see whether the determined altitude of the aircraft is above or below a predefined altitude threshold value. If it is determined that the altitude of the aircraft is above the predefined altitude threshold value, the omnidirectional antenna(s) is/are disabled, S403, in order to restrict the wireless data communication to solely occur through the directional antenna(s).

However, if it would have been determined that the altitude of the aircraft was below the predefined altitude threshold value, a check is performed, S404, to see if the omnidirectional antenna(s) is/are enabled. If all the statement is true, then one goes back to monitoring/determining, S401, the altitude of the aircraft, if the omnidirectional antenna(s) is/are disabled, one preferably enables all of the available omnidirectional antennas, S405, and then returns back to monitoring/determining, S401, the altitude of the aircraft.

Figure 6:
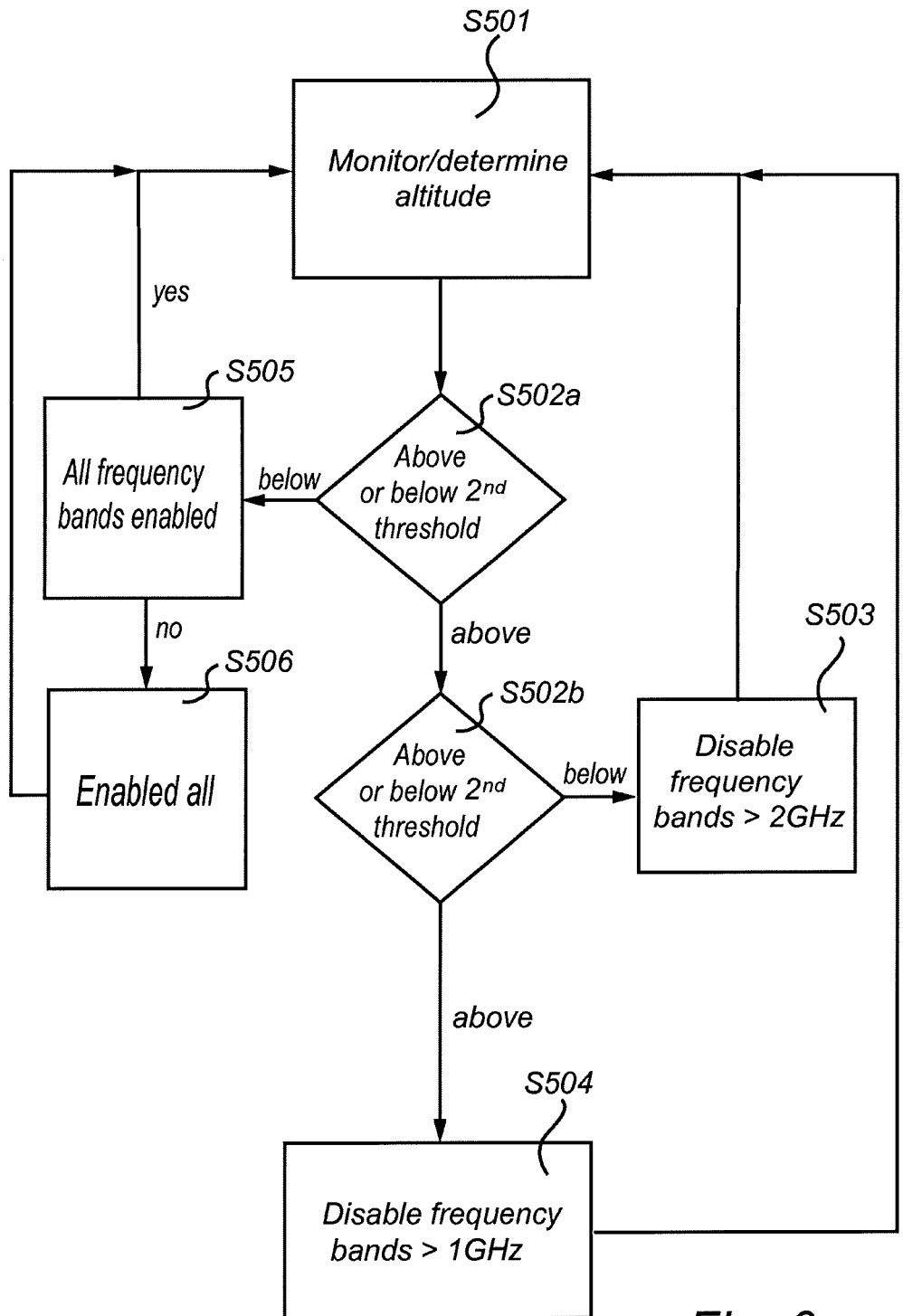
FIG. 6 is a schematic flow chart representation of a method for wireless data communication in accordance with another embodiment of the present invention.

In FIG. 6 another flow chart representation of a method for wireless data communication in accordance with another embodiment of the present invention is illustrated. In this particular embodiment, there are two different altitude threshold values provided in order to make the method more dynamic and agile. More specifically, the method illustrated in FIG. 6 enables for better utilization of the specific advantageous characteristics of the two different antenna types as they differ in performance at different altitudes. Similar to the method described in reference to FIG. 5, a router or router network according to any of the previously discussed embodiments of the invention is provided, and the altitude of the aircraft is monitored/determined, S501 (e.g. by an altitude determining unit).

Further, a check is performed, S502a, to see if the altitude of the aircraft is above or below a first altitude threshold value (e.g. above 1300 m). If it is determined that the aircraft's altitude is above the first altitude threshold (i.e. the aircraft is currently at high altitude), the omnidirectional antenna(s) is/are disabled, S504, or at least they are not available for receiving and transmitting radio signals.

However, if it would have been determined that the aircraft's altitude was below the first threshold, the method includes a step of determining, S502b, if the altitude of the aircraft is above or below a second altitude threshold level (e.g. above or below 600 m). If it is determined to be below the second altitude threshold value (i.e. the aircraft is currently at low altitude) then the directional antenna(s) is/are disabled.

Further, if it would have been determined/concluded that the aircraft's altitude was above the second altitude threshold (i.e. the aircraft is currently at mid altitude), then the method preferably comprises a step of checking, S505, if all antennas are enabled. If all antennas are enabled, go back to monitoring/determining, S501, the altitude, if not, then all antennas are enabled or at least made available for wireless data communication between the aircraft the external ground base stations.

Figure 7:
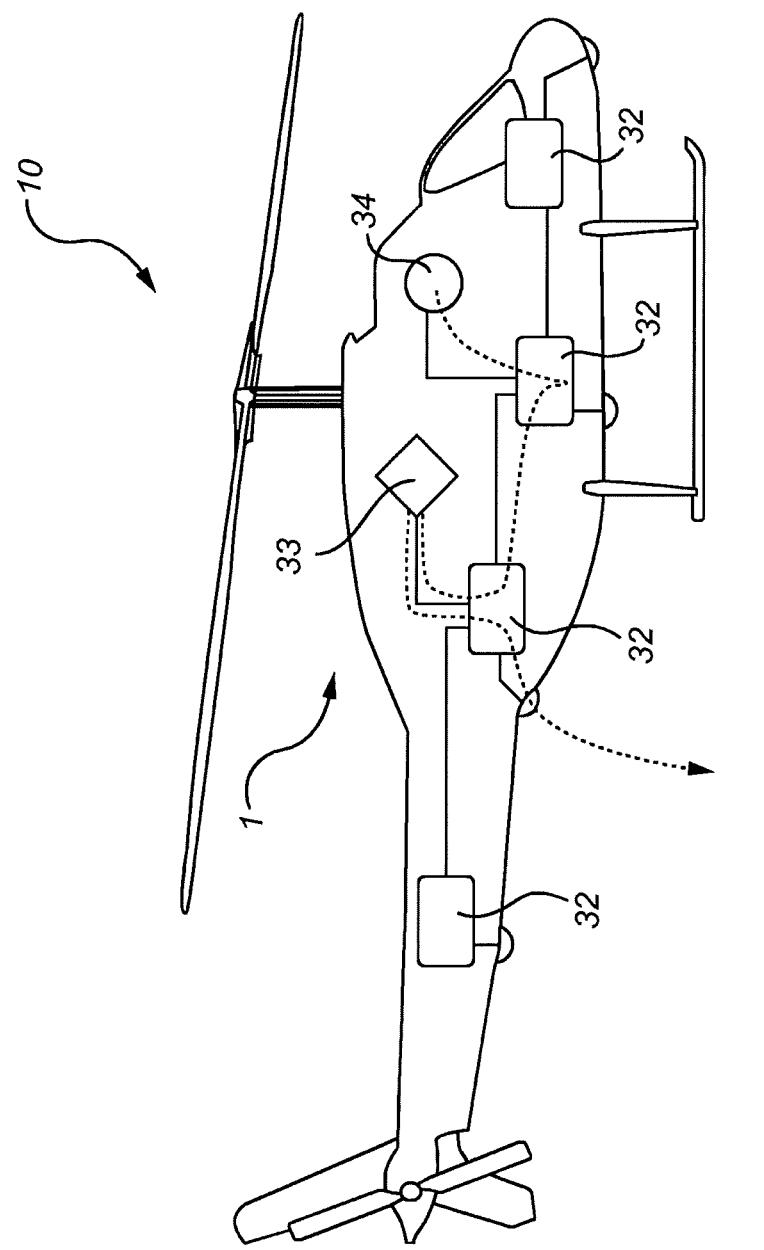
FIG. 7 is a schematic side-view illustration of an aircraft having a wireless communication system with a centralized router network, in accordance with an embodiment of the present invention.

The router network 3 will now be discussed in greater detail. In the embodiment as illustrated in FIG. 7, the router network comprises a plurality of connectivity nodes 32 being physically separated and distributed within the aircraft. The connectivity nodes are connected to each other via a bus (shown as a solid line) to provide efficient data communication, such as an Ethernet bus. Further, each connectivity node comprises a control unit, and at least one modem, and preferably a plurality of modems. Still further, each connectivity node comprises a connection to at least one of the antennas. Thus, each connectivity node is connected to a single antenna, a plurality of antennas, or a group of antennas. Further, each antenna is preferably connected only to one of the connectivity nodes.

The connectivity nodes are preferably arranged at various positions in the aircraft, and preferably relatively close to the antenna or group of antennas to which they are connected. It is further preferred that at least one connectivity node is located in an aft section of the aircraft, and that at least one connectivity node is located in a fore section of the aircraft. Put differently, it is preferred that the distance between the two connectivity nodes being farthest from each other is at least 50% of the length of the fuselage of the aircraft, and preferably at least 60%, and more preferably at least 70%, and most preferably at least 80%.

The router network may further comprise one or several client node(s) 34, such as access points for WLAN communication, providing an interface to clients onboard the aircraft.

In the embodiment illustrated in FIG. 7, the router network further comprises a router node 33, functioning as a master node, and being connected to the connectivity nodes 32 via a bus, such as an Ethernet bus. Further, the router network may comprise one or more client nodes 34, such as access points for WLAN communication, providing an interface to clients onboard the aircraft.

In this embodiment, each connectivity node comprises one or more modem(s). Further, each connectivity mode is connected to the other router modules via the bus. Still further, each connectivity node is connected to one or more antennas, and preferably the antennas being located closest to the respective connectivity node.

In this embodiment, the router network is a centralized system, wherein each connectivity node operates as a slave under the control and supervision of the router node 33. Thus, all data communication passes through the router node 33. An exemplary path for an IP packet is illustrated with dashed lines. An IP packet is received at the client node 34, and is forwarded to the closest connectivity node 32. This connectivity node forwards it, via another connectivity node, to the router node 33. The router node determines which connectivity node to use for the transmission, in this example the connectivity node 32 closest to the aft, and forwards the IP packet to this connectivity node, via an intermediate connectivity node, for transmission via an antenna connected to this connectivity node.

Figure 8:
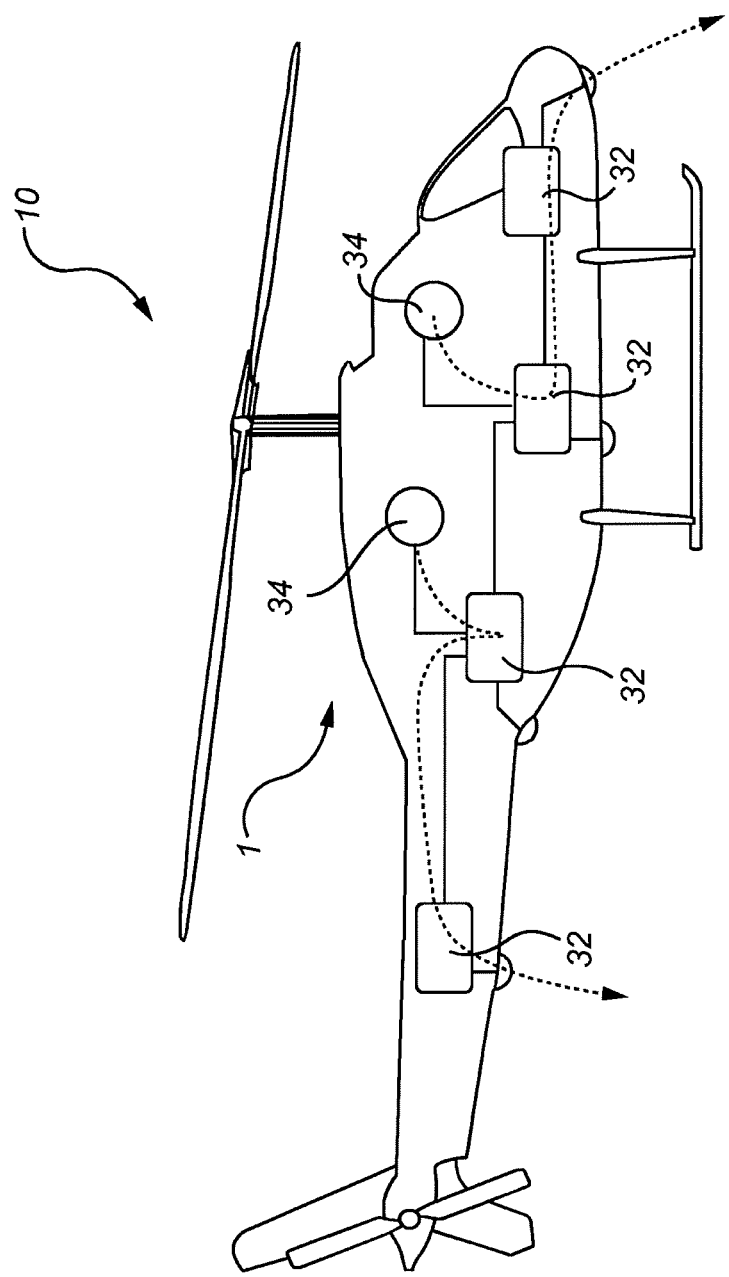
FIG. 8 is a schematic side-view illustration of an aircraft having a wireless communication system with a distributed router network, in accordance with an embodiment of the present invention.

In an alternative embodiment, illustrated in FIG. 8, the router network does not comprise a router node. Instead, the router network is a distributed system in which the connectivity nodes 32 together performs the functions of the master in a distributed fashion. Again, the router network may comprise one or more access points 34. Here, the router node preferably receives all on-board network traffic, and forwards this to the connectivity nodes and the access points. Further, the router node preferably determines which connectivity node to route traffic to, depending on packet, stream, client or other basis.

In this embodiment, the router network is a distributed system, wherein each connectivity node operates independently, in co-operation with the other connectivity nodes, so that each connectivity node functions as a router. Two possible ways for an IP packet transmission are illustrated, by way of example, with dashed lines. In one exemplary transmission path, an IP packet is received at the client node 34 being closest to the aft, and is then forwarded, via the bus, to the closest connectivity node 32, and then forwarded to the connectivity node 32 being arranged in the aft of the aircraft, and transmitted on an antenna connected to this connectivity node. In the second exemplary transmission path, an IP packet is received at the client node 34 being closest to the fore end of the aircraft, and then forwarded, via the bus, to the closest connectivity node 32, and then forwarded to the connectivity node 32 being arranged in the fore end of the aircraft, and transmitted on an antenna connected to this connectivity node.

Thus, the distributed connectivity nodes here each operate as a router, and are completely standalone and independent. Thus there is no main or master router, but rather "peer routers". Moreover, by configuring the routers to be able to communicate with each other through an onboard router network data streams can efficiently be distributed among the plurality of routers and the corresponding exterior network connections. Thus, each router can "borrow" bandwidth capacity from any one of the other routers onboard the vehicle. This results in a superior communication system in terms of capacity and bandwidth capability. Moreover, the communication system is more robust as compared to conventional systems. For example, if one router/node would temporarily not be able to communicate with an exterior mobile network due to e.g. software/hardware malfunction, poor network coverage, signal obstruction, etc., the data packets received from and sent to clients can instead be routed to other routers onboard the vehicle. Also, since each router is standalone and independent the communication system is less dependent on one single router/node.

The access points, also referable to as client nodes, are preferably connected to the closest connectivity node or router node.

Each node preferably comprises a controller unit. The controller units can be provided by means of appropriate software, hardware or a combination thereof. The controller, or controller units, may be partly or wholly integrated into the nodes or be a standalone unit connected to the router network. Optionally, the router network may comprise only one single central controller in operative connection with each individual router on board the aircraft.

In accordance with another exemplary embodiment, each connectivity node router comprises a plurality of modems for communication with the at least one exterior mobile network, wherein each modem is connectable to at least two external antennas in order to enable MIMO communication. Thus, the router network may comprise several antenna ports per modem, enabling MIMO for the external communication, and the high bandwidth thereby provided can then be distributed to the internal clients with e.g. 802.11n. The modems comprised by each connectivity node may share a plurality of antennas, i.e. there may be for example two or four antennas arranged on the roof of a carriage which can only be utilized by one modem at the time.

Further, in accordance with yet another exemplary embodiment, each connectivity node of the may be associated with a different mobile network operator. Thus, if a specific network operator has poor network coverage in certain areas, other connectivity nodes within the same aircraft having other network operators with better network coverage can be used to handle some of the data traffic.

Moreover, the connectivity node may further form a subscriber identity module (SIM) pool including a plurality of SIMs, and wherein the controller is capable of periodically assigning SIMs within the SIM pool to any one of the plurality of connectivity nodes through the onboard router network. By including a SIM pooling capability in the system the number SIM cards (SIMs) and also the number of modems in the system can be reduced. By using a common pool of SIMs, accessible to each of the plurality of connectivity nodes, the total number of SIMs may be reduced, and the SIMs available may be used more efficiently. At the same time, the accessibility for each connectivity node (or the modems within each node) to an adequate SIM at each time increases since the number of accessible SIMs can hereby be managed more efficiently.

Furthermore, the need for stocking up each connectivity node with a large number of SIMs, where a number of those may be identical in several of the nodes, is diminished. Thus, since there is no need for having a large number of SIMs in each node, the number of modems in each node may be reduced. Moreover, the number of modems can further be reduced since there is a smaller number of modems required to establish adequate communication quality, since it now becomes possible to use each modem more efficiently.

In particular, it hereby becomes possible to provide access for each node to one or several suitable SIM(s) in every country in which the vehicle may travel.

Further, due to the pooling of all available SIMs in the system, the probability that each connectivity node is provided with a working connection to an exterior mobile network at all times increases. In other words, the probability of a scenario where one of the nodes would have no SIM that is currently associated with an operator having network coverage in a particular area is reduced.

Pooling of SIM cards is per se known from EP 2 518 977 by the same applicant, said document hereby being incorporated by reference.

In the above-discussed SIM pool embodiment, the SIM cards forming the SIM pool may be arranged in one of the connectivity nodes, and being accessible for modems from all the connectivity nodes. Alternatively, the SIMs of the SIM pool may be distributed, and arranged in smaller parts in several or all the connectivity nodes. As yet another alternative, the SIM pool may be arranged at another unit on-board the aircraft. Thus, in any of these alternatives, instead of having the SIM cards hardwired to each modem, the SIM card traffic is routed via a software serial multiplexer in each node's operating system. The software serial multiplexer can route the SIM card traffic between an arbitrary SIM card in the node, or on other nodes or units, and an arbitrary modem in the node. This allows any modem to use any SIM card.

The alternative where SIMs are pooled between nodes on the aircraft may be referred to as remote SIM with on-board SIM pool. Since SIM card traffic intermediately exists as data in the operating system, and since the SIM card communication protocol is fairly resistant to latency, the SIM card traffic can be transferred over more or less arbitrary communication links. One example of such a communication network is the Ethernet backbone of an aircraft. It is therefore possible to allow a modem in one connectivity node onboard a vehicle to use a SIM card that is physically located inside another node, or other device, onboard the same aircraft. If the connectivity to the aircraft is supplied by a distributed set of routers/nodes, all nodes in the set can share a common pool of SIM cards that can be assigned in an arbitrary way.

It is also possible to arrange the SIM pool on a specific unit onboard the aircraft, such as in one of the nodes or on a separate unit. Still further, the SIM pool may be arranged outside the aircraft. Such an embodiment may be referred to as remote SIM with central SIM pool. It has been found that in addition to the previous case, and with wwan links with low enough latency, it is also possible to send the SIM card traffic over the internet. It is therefore possible to have a node with a plurality of modems and only one or a few SIM cards physically located inside the node. These SIM cards can preferably be of a type that can roam to any other operator's network, even if this implies higher data cost. This, or these, physical SIM card(s) is only used for the initial communication with a central SIM card bank, to get the first SIM card identity. Once at least one other modem is connected using a remote SIM identity, further communication with the central SIM card bank can be done over this established link.

The SIM cards for pooling in any of the above-discussed ways need not be physical SIM cards, arranged locally or centrally, but software SIMs, also referred to as E-SIM, soft SIM or virtual SIM, may also be used. E-SIM/Virtual SIM is a method where the SIM identity is electronically transferred from a central service to a SIM-circuit or a smart-SIM-card inside the node. This smart SIM/SIM-circuit can hold multiple SIMs identities at the same time. Normally you can only use one SIM identity at the same time, so each modem needs one smart SIM-card or SIM-circuit per modem. So when the SIM-identity is downloaded to the router/node, they can be used without communication with the central service/server.

If you have four modems and four smart-SIM/SIM-circuits and each SIM circuit/smart modem have five SIM-identities, then it's possible to travel through five countries and shift subscription at each border and have all four modems connected at all time without communicating with the central server/service. In this case twenty subscriptions are used.

Using this technology it is also possible to change SIM-identity/subscription without changing physical SIM-cards. This method has the advantages of the SIM-multiplexer and the Remote SIM without their weaknesses of having the administration of physical SIM-cards.

Sharing/pooling of the SIM-cards between carriages, and possibly even between vehicles, provides many advantages. For example, the amount of data being forwarded through various modems and SIMS may vary greatly, both over time, and between different carriages and vehicles. Many SIMs have a cap on the available monthly data amount, and if you pass that cap, the communication through the SIM will restricted/throttled, so that transmission will occur at very limited data speed on that SIM/subscription during the rest of the month. On the other hand, if the available data for each SIMs/subscriptions are not used for a certain month, it can often not be saved for later, which means that you pay for resources that you do not use. By distributing and sharing the SIM capacity, the available amount of data traffic can be distributed and used more efficiently. Hereby, it becomes possible to use fewer SIMs without any reduction in performance, or to obtain an improved performance.

Further, SIM pooling makes the change of subscription plans etc easier to handle, especially when the SIM cards are arranged externally rom the vehicle, or even are non-existent (E-SIM/virtual SIM). Many subscriptions are locked to a physical SIM, changing subscription plan or operator may require that you are changing the physical SIMs in the onboard nodes. Shipping SIM-cards out to customers is tedious and expensive, and then someone needs to open the router and fit physical SIM-cards inside the router. This takes time, needs planning and logistics. If something goes wrong you may need to send back and change one or several SIMs. This is very resource demanding activities. In the case you want to change or add a new cellular operator to the node, you need to change and fit new physical SIMs inside the node. This is much easier to handle if you have all SIMs arranged centrally in a separate location outside the aircraft (remote SIM with external SIM pool), or have the SIMs in virtual firm.

Further, as already indicated, the use of a central SIM pool, be it with physical or virtual SIMs, also enabling pooling between aircraft, and not only between carriages within a single aircraft. Hereby, the distribution and use of SIMs can be administered and handled even more efficiently. For example, SIMs for an aircraft having low data traffic can periodically be exchanged with SIMs from an aircraft having high data traffic, SIMs for aircrafts being periodically out of traffic may be removed and use elsewhere, SIMs having reached the cap limit for the present month may be taken out of use and replaced with other SIMs until the end of the month, etc.

The invention has now been described with reference to specific embodiments. However, several variations of the communication system are feasible. For example, the nodes may function as a centralized network or as a distributed network. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A wireless communication system for an aircraft, said wireless communication system comprising:
   a router network connected to a plurality of antennas, wherein the router network is configured to transmit and receive wireless data communication to and from a stationary communication server outside said aircraft through at least one ground base station via said antennas,
   wherein the router network comprises a plurality of connectivity nodes being physically separated and distributed within the aircraft, the connectivity nodes being connected to each other via a bus, and each connectivity node comprising a control unit, at least one modem, and
   wherein each antenna is connected only to one of the connectivity nodes,
   wherein said aircraft comprises a roll axis and a pitch axis which define four separate quadrant sector when projected onto a ground surface below the aircraft;
   wherein the plurality of antennas comprises four groups of directional antennas, each group comprising at least one directional antenna and each group being oriented to radiate and/or receive radio waves towards/from a separate quadrant sector;
   wherein said aircraft further comprises a vertical axis, and wherein said roll axis and vertical axis together define a first vertical plane, and wherein said pitch axis and vertical axis together define a second vertical plane intersecting said first vertical plane;
   wherein said first vertical plane and said second vertical plane together define four separate portions of a fuselage of the aircraft; and
   wherein said four groups of directional antennas are arranged at separate portions of said fuselage.

2. The wireless communication system of claim 1, wherein the router network is a distributed computing network, without any master node.

3. The wireless communication system of claim 1, wherein the router network is a centralized computing network, comprising a master node.

4. The wireless communication system of claim 3, wherein the router is arranged to receive all data communication within the network, and to determine how to route the data communication to the different connectivity nodes.

5. The wireless communication system of claim 1, wherein the bus is an Ethernet bus.

6. The wireless communication system of claim 1, wherein the router network further comprises at least one client node, arranged to receive and transmit data communication to and from at least one client onboard the aircraft.

7. The wireless communication system of claim 1, wherein said plurality of antennas comprises at least one omnidirectional antenna and at least one directional antenna.

8. The wireless communication system of claim 7, wherein the wherein said system is configured to restrict the wireless data communication through said at least one omnidirectional antenna when a current altitude of said aircraft is above a certain altitude.

9. The wireless communication system of claim 1, further comprising an altitude determining unit configured to determine the current altitude of the aircraft.

10. The wireless communication system of claim 1, wherein said plurality of antennas are mounted to and/or integrated in an external surface of said aircraft.

11. The wireless communication system of claim 1, wherein said plurality of antennas comprises at least two groups of directional antennas, each group comprising at least one directional antenna and each group being arranged to radiate and/or receive radio waves to and/or from sectors of a ground surface below the aircraft, the sectors being at least mostly non-overlapping.

12. The wireless communication system of claim 1, wherein the plurality of antennas comprises at least two omnidirectional antennas distributed along a length of the aircraft.

13. The wireless communication system of claim 1, wherein at least some of the antennas are orthogonal pair antennas.

* * * * *